(12) United States Patent  (10) Patent No.: US 7,182,145 B2
Powers et al.                (45) Date of Patent: Feb. 27, 2007

(54) WATER BUCKET SYSTEM (75) Inventors: Duane Allan Powers, Greybull, WY (US); Timothy James Mikus, Greybull, WY (US); Cody Lee Barritt, Basin, WY (US)

(73) Assignee: Aerial Firefighting Specialists, Greybull, WY (US)

( * ) Notice: Subject to any disclaimer, the term of this patent is extended or adjusted under 35 U.S.C. 154(b) by 196 days.

(21) Appl. No.: 10/926,498

(22) Filed: Aug. 26, 2004

(65) Prior Publication Data

US 2005/0087651 A1    Apr. 28, 2005

Related U.S. Application Data

(60) Provisional application No. 60/498,547, filed on Aug. 28, 2003.

(51) Int. Cl.
  *A62C 25/00*   (2006.01)
  *A62C 11/00*   (2006.01)
  *B05B 9/00*    (2006.01)
  *B64D 1/18*    (2006.01)
  *A01G 27/00*   (2006.01)

(52) U.S. Cl. ............... 169/53; 169/46; 169/47; 169/30; 169/52; 239/148; 239/146; 239/171; 239/175; 239/67; 239/68; 239/69; 239/70; 239/71

(58) Field of Classification Search ........... 169/53, 169/52, 46, 47, 30; 239/146, 148, 171, 175, 239/67–71
See application file for complete search history.

(56) References Cited

U.S. PATENT DOCUMENTS

| 3,661,211 | A |   | 5/1972 | Powers |
| 3,710,868 | A |   | 1/1973 | Chadwick |
| 3,750,686 | A | * | 8/1973 | Cook ................ 134/95.3 |
| 4,240,507 | A |   | 12/1980 | Hokkanen |
| 4,530,463 | A | * | 7/1985 | Hiniker et al. ........ 239/71 |
| 5,279,481 | A |   | 1/1994 | Trotter et al. |
| 5,451,016 | A |   | 9/1995 | Foy et al. |
| 5,829,809 | A |   | 11/1998 | Arney et al. |
| 6,003,782 | A | * | 12/1999 | Kim et al. ........... 239/171 |
| 6,125,942 | A | * | 10/2000 | Kaufman et al. ....... 169/53 |
| 6,192,990 | B1 |  | 2/2001 | Brooke |
| 6,578,796 | B2 |  | 6/2003 | Maeda |
| 6,622,966 | B1 | * | 9/2003 | McConnell, Sr. ...... 244/136 |
| 6,688,402 | B1 | * | 2/2004 | Wise ................ 169/53 |

* cited by examiner

*Primary Examiner*—Davis Hwu
(74) *Attorney, Agent, or Firm*—Emery L. Tracy (57) ABSTRACT

A water bucket system having a water bucket is provided. The water bucket system comprises computer controlled loading of the water bucket from a water source, partial drop control means for controlling the drop of water from the water bucket onto a desired location, and variable flow rate control means for varying the flow of water from the water bucket. A water bucket for carrying water is also provided. The water bucket comprises a main support cable, a spreader plate secured to the main support cable, a plurality of secondary support cables secured to the spreader plate, a plurality of equally spaced webbing straps secured to the secondary support cables, a fabric envelope secured to the webbing straps, and a compression hoop secured to the webbing straps and the fabric envelope, and a valve secured to the fabric envelope.

38 Claims, 11 Drawing Sheets

WATER BUCKET SYSTEM

The present application is a continuation of pending provisional patent application Ser. No. 60/498,547, filed on Aug. 28, 2003, entitled "Water Bucket System".

BACKGROUND OF THE INVENTION

1. Field of the Invention

This invention relates generally to a water bucket for helicopters and the like and, more particularly, the invention relates to water bucket systems having a computer controlled loading, partial drop control, and variable flow rates.

2. Description of the Prior Art

Not all wildfires can be fought from the ground. Due to rugged terrain and accessibility difficulties, aerial firefighting frequently becomes the most efficient and effective way of controlling wildfires. Aerial firefighting and protection of forests and related resources through controlling wildfires began in the late 1920's. Since the first 1200-pound sling by a Marine Corps Sikorsky helicopter in 1954, a small group of people in private industry and the U.S. Department of Agriculture have been developing various systems to effectively use helicopters for aerial firefighting.

Helicopter carried water buckets are well known for use in fighting forest fires. These buckets, at the simplest, may comprise of a rigid or flexible wall with a flapper valve at the bottom of the bucket. The pilot remotely activates the valve from the helicopter. This valve either works as a simple poppet type valve or is hinged in the center and a pneumatic cylinder or an electric actuator lifts the valve up off of the seal or pulls the two-hinged plates together allowing the bucket to drain. This requires great force due to the hydrostatic pressure at the bottom of the bucket.

The most commonly used water bucket uses an electric solenoid that releases the fabric underneath allowing the contents to drain. This design is limited in that once the solenoid is activated the entire contents are drained and splitting the load is impossible. The gated valve system with a load cell, providing a weight indication to the pilot, is becoming popular because of the ability to split the load and manage the weight lifted from the helicopter. Often times when dropping a load the pilot does not need to drop the entire load in one spot. The ability to make split drops saves trips back to the water source. In order to accomplish this the pilot must time the amount of water that comes out of the bucket and close the valve again before all the water is released.

Filling the bucket is a risky task for the pilot. The pilot must maintain a hover in adverse conditions while at the same time fill the bucket to a point that does not overload the aircraft. The current systems require the pilot to watch a load indicator connected to a load cell that measures the weight the helicopter is lifting. The pilot must manually open and close the bucket valve with a switch until the desired load is achieved. This is increased workload on the pilot at a time when the workload is already heightened. Other systems require the use of plugs, zippers, or cinch straps to manage weight.

During operations close to the ground, precise and rapid flight-control movements are required to avoid obstacles. The most common factor associated with obstacle-strike accidents is high workload. Thus, improvements made to decrease pilot workload such as the proposed invention should make the environment safer for the pilot.

Little data is gathered and categorized on accidents on the use of helicopters in the firefighting role operating under U.S. Federal Aviation Regulations Part 137 and 133. However, if reports of helicopters operating under U.S. Federal Aviation Regulations Part 135 are reviewed, some good correlations can be made. Data shows that pilot workload is the biggest cause of accidents related to human error. Reducing pilot workload will also allow the pilot to concentrate on the other factors associated with pilot error and should reduce risks in the other categories.

SUMMARY

The present invention is a water bucket system having a water bucket. The water bucket system comprises computer controlled loading of the water bucket from a water source, partial drop control means for controlling the drop of water from the water bucket onto a desired location, and variable flow rate control means for varying the flow of water from the water bucket.

The present invention further includes a water bucket for carrying water. The water bucket comprises a main support cable, a spreader plate secured to the main support cable, a plurality of secondary support cables secured to the spreader plate, a plurality of equally spaced webbing straps secured to the secondary support cables, a fabric envelope secured to the webbing straps, and a compression hoop secured to the webbing straps and the fabric envelope, and a valve secured to the fabric envelope.

In addition, the present invention is a method for loading and dropping water from a water bucket. The method comprises loading water into the water bucket from a water source, measuring the-water load, controlling the drop of water from the water bucket onto a desired location, and varying the flow of water from the water bucket.

DETAILED DESCRIPTION OF THE PREFERRED EMBODIMENTS

Figure 1:
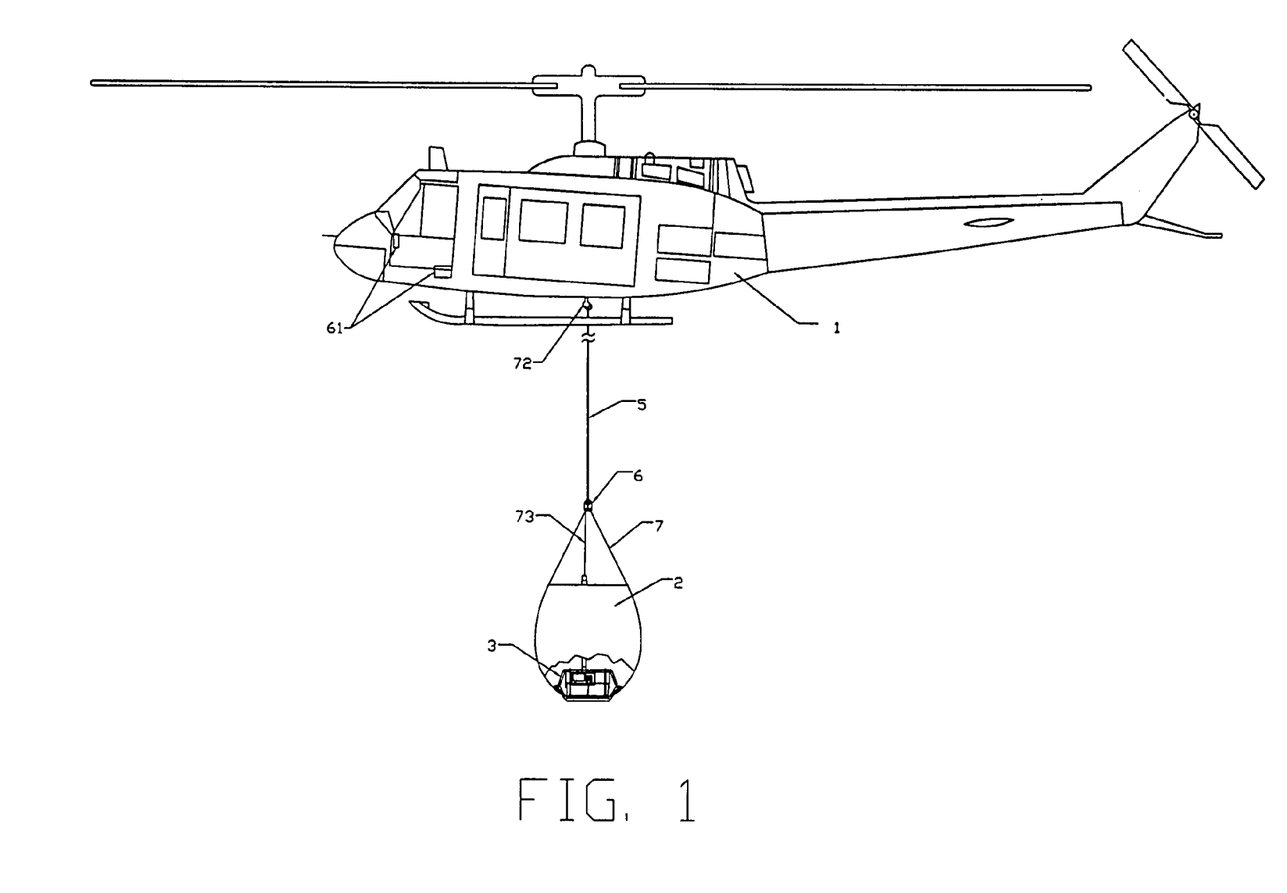
FIG. 1 is an elevational side view illustrating a water bucket system, constructed in accordance with the present invention, with the water bucket system being carried by a helicopter.
Figure 10:
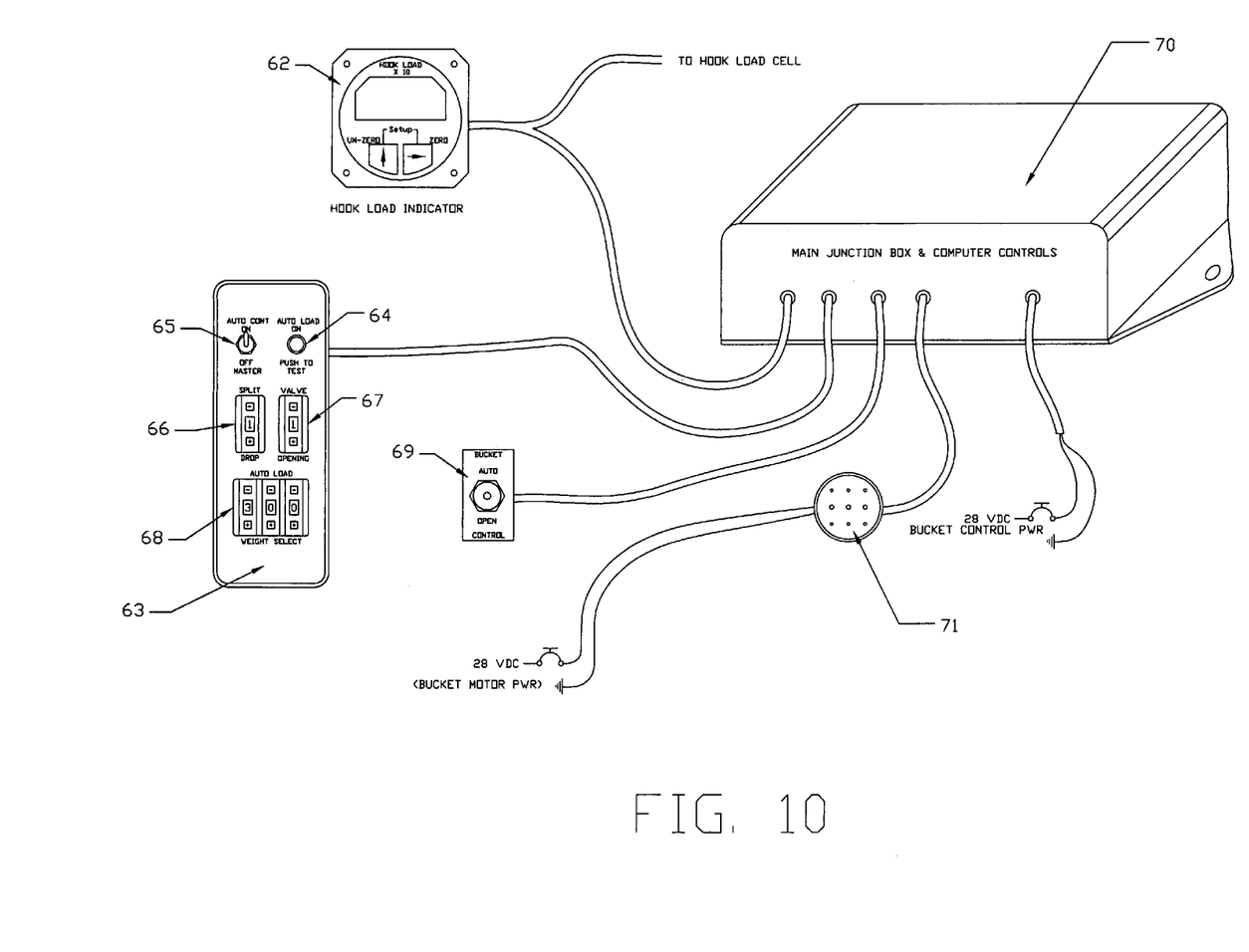
FIG. 10 is a diagram illustrating the control components of the water bucket system, constructed in accordance with the present invention.

As illustrated in FIGS. 1 and 10, the present invention is a computer controlled water bucket system, indicated generally at 10, for use with helicopters 1 and the like. The water bucket system 10 of the present invention comprises a computer controlled loading, partial drop control, and variable flow rate control. To accomplish these, the water bucket system 10 further includes a cargo hook load cell for measuring weight, a twenty-four (24) VDC electrically actuated mechanical bucket valve 3, a momentary DPDT (double pole double throw) drop switch 69 with center off, five (5) BCD (Binary Coded Decimal) thumb wheels 66, 67, 68 and a computer system 70 mounted in the helicopter.

Preferably, the control of the water bucket system 10 is separated into three (3) different phases: Manual Mode, Auto Load, and Auto Drop. Automating these processes results in less cockpit workload allowing the pilot to concentrate on flying the aircraft and the surrounding environment while at the same time increasing the efficiency and effectiveness of the helicopter in the aerial firefighting role.

To initiate auto load the pilot selects the desired weight 68, pushes the drop switch 69 forward, immerses the water bucket 2, releases the switch 69 to close the valve 3, and pulls out of the water. The water bucket system of the present application automatically opens and closes the bucket valve 3 as the bucket is pulled from the water until the desired weight is achieved. Once the weight is achieved, the bucket is pulled completely from the water and a normal climbout is initiated. When the valve 3 closes after the desired weight is achieved, the auto load function is complete and deactivates so "G" forces associated with acceleration and turns will not cause the door to cycle. The bucket control system then reverts to the manual mode until the drop switch is activated.

For the auto drop feature the pilot selects the number of splits 66 desired and the valve opening 67 required for the drop. The drop switch 69 is held forward and the valve 3 opens for the proper amount of time and closes.

At any time, the valve 3 can be actuated manually by pressing the drop switch 69 in the aft position opening the valve 3 reverting to manual mode, releasing the switch 69 closes the valve. Moving the drop switch 69 to the aft position overrides all automated functions.

The efficiency of water delivered increases since the water bucket system 10 of the present invention allows the pilot to adjust the load carrying capabilities on the fly versus manually adjusting cinch straps or similar weight management mechanisms. The water bucket system 10 is also more efficient than a system equipped with only a load cell and valve control due to the fact that the present system would be more repeatable and accurate than a pilot watching a load cell readout. In addition, the ability to split the load accurately results in using only the required amount of the buckets contents on each fire spot.

Figure 2:
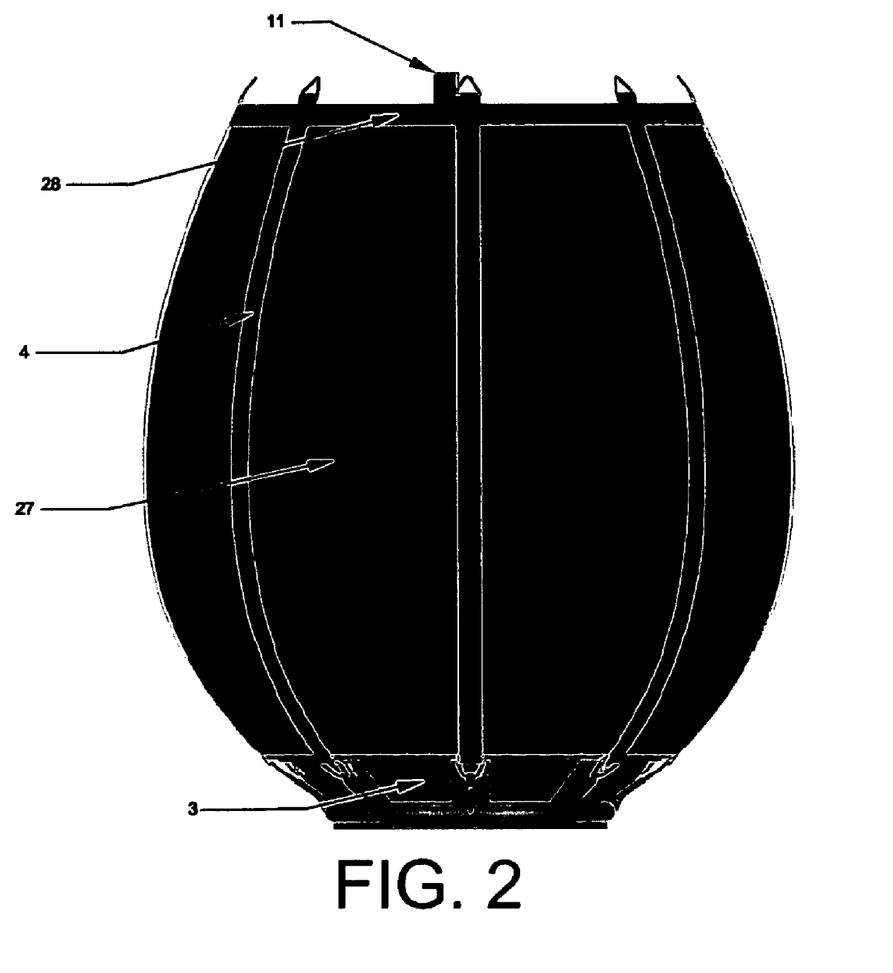
FIG. 2 is an elevational side view illustrating a fabric envelope attached to a valve of the water bucket system, constructed in accordance with the present invention.
Figure 3:
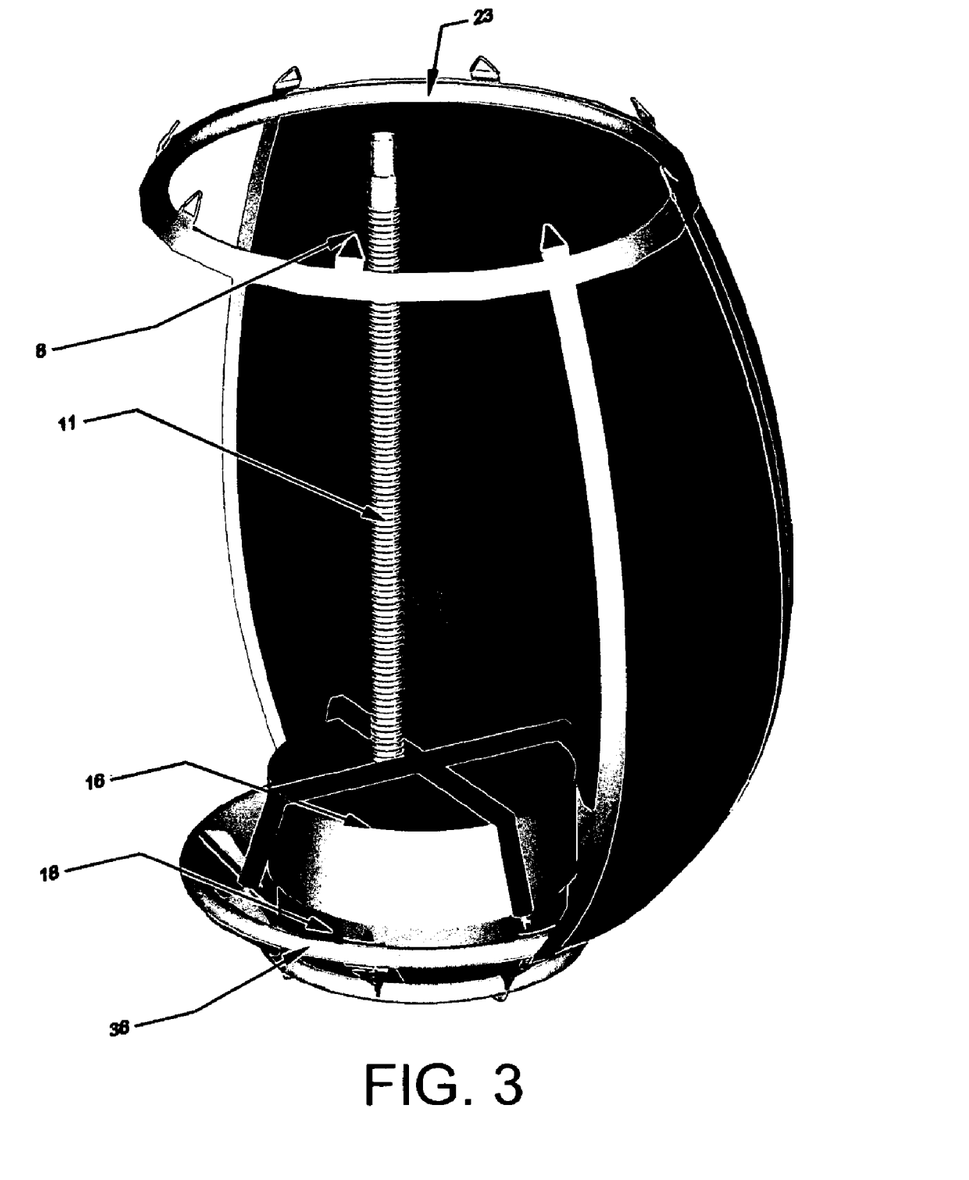
FIG. 3 is a cutaway perspective view illustrating the fabric envelope attached to a valve of the water bucket system, constructed in accordance with the present invention.

Water Bucket Design:

1. As illustrated in FIGS. 1–3, the water bucket support structure consists of a main support cable 5, a spreader plate 6, eight secondary support cables 7, a compression hoop 23, eight webbing straps 4 welded vertically in eight (8) equally spaced locations to a fabric envelope 27 and a valve 3.

Figure 4:
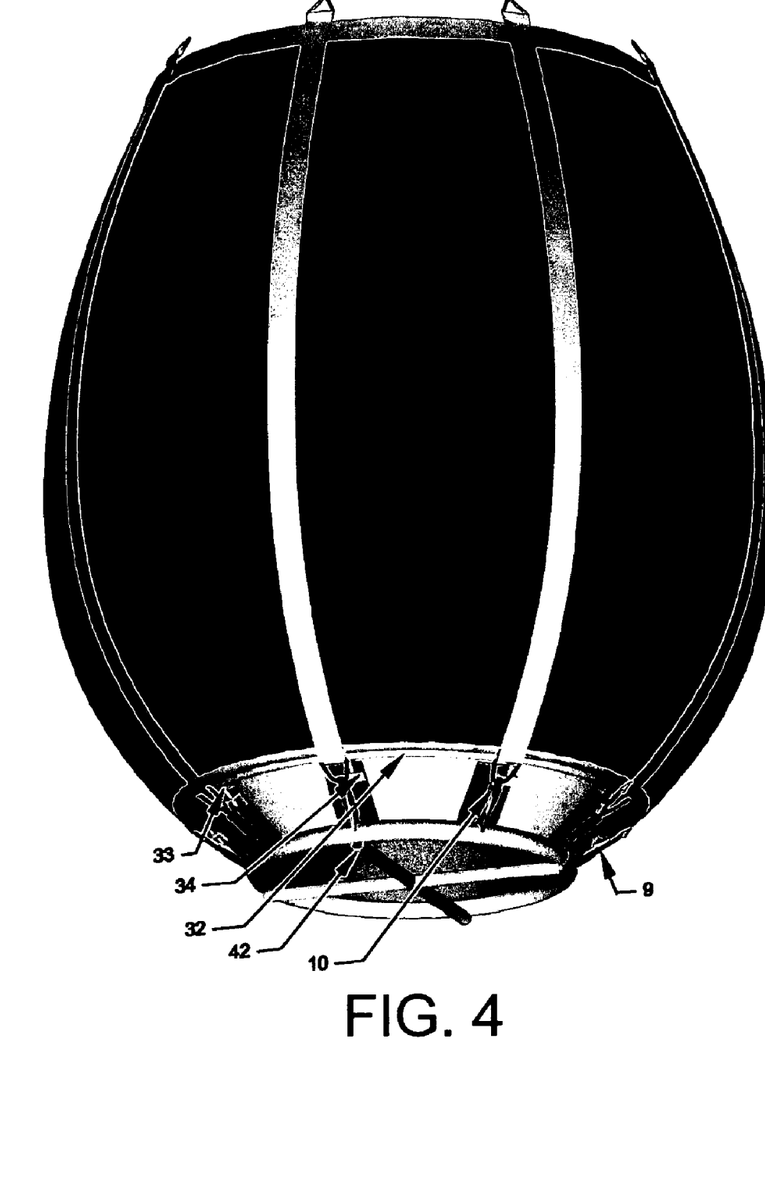
FIG. 4 is a perspective view illustrating a valve attached to webbing and a fabric envelope, constructed in-accordance with the present invention.
Figure 6A:
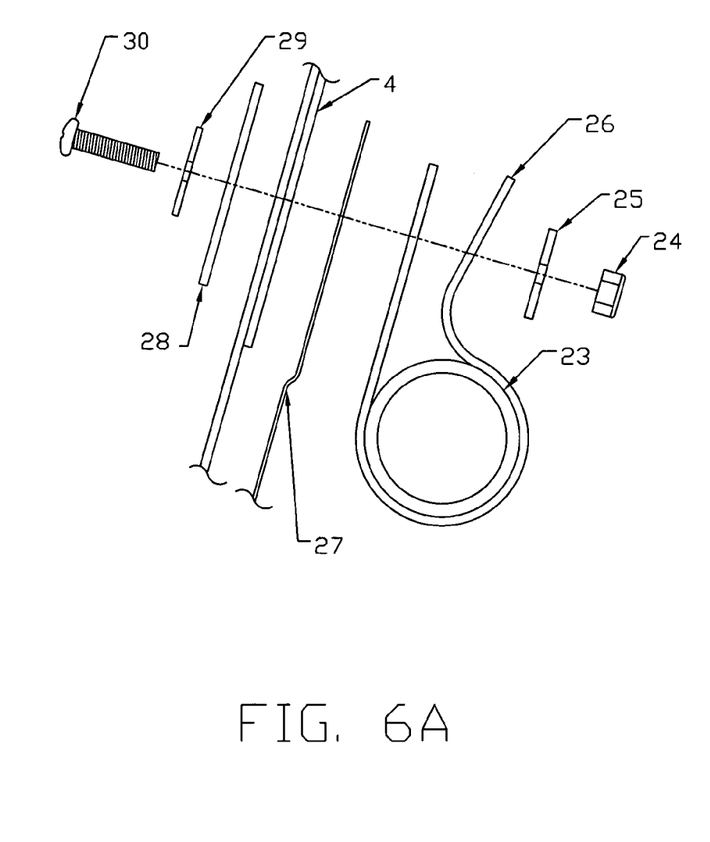
FIG. 6a is an exploded view illustrating a fabric envelope attached to a compression hoop, constructed in accordance with the present invention.
Figure 6B:
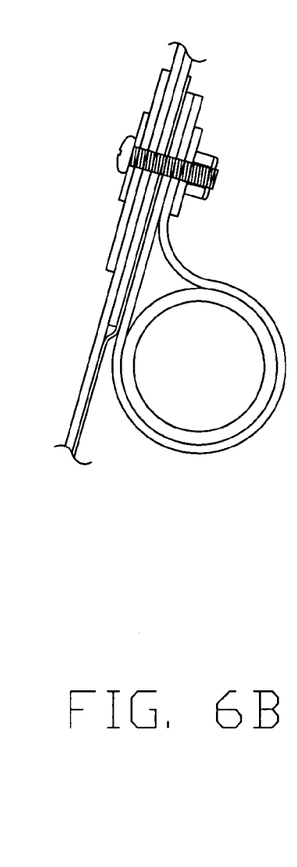
FIG. 6b is a sectional view illustrating the fabric envelope attached to the compression hoop of FIG. 6a, constructed in accordance with the present invention.
Figure 7A:
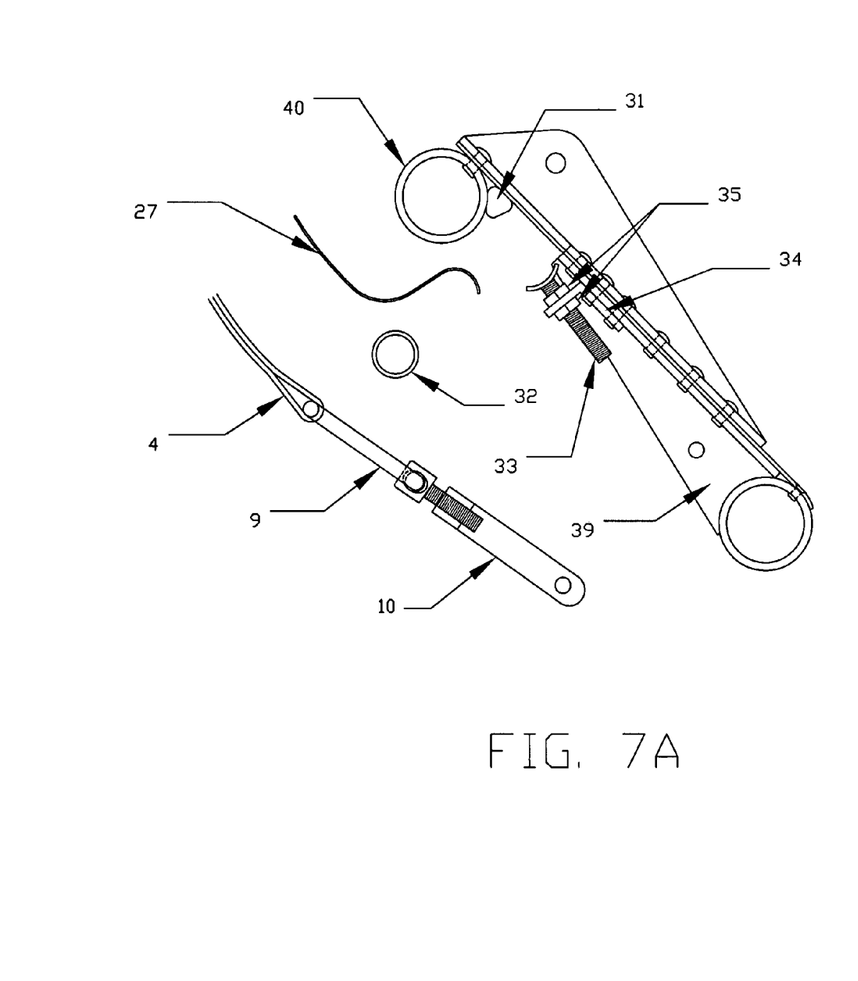
FIG. 7a is an exploded view illustrating a fabric envelope attached to a valve, constructed in accordance with the present invention.
Figure 7B:
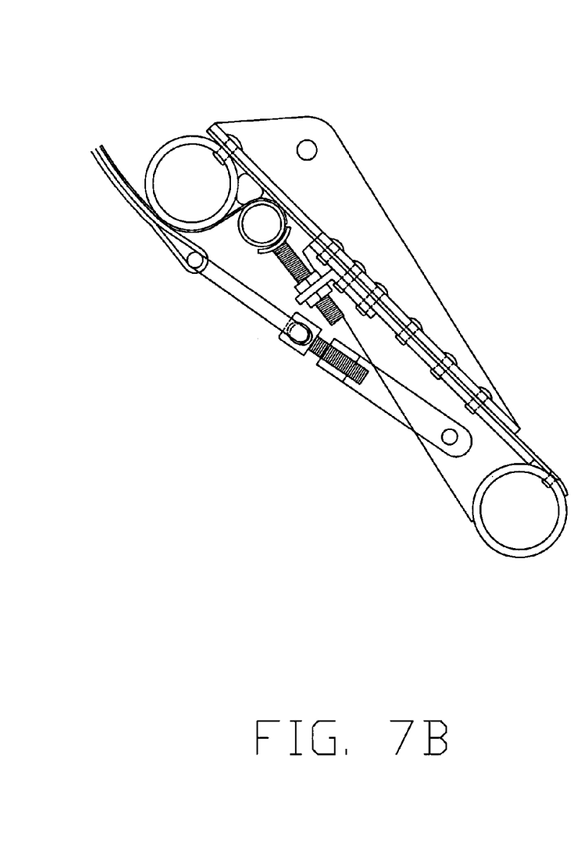
FIG. 7b is a sectional view illustrating the fabric envelope attached to the valve of FIG. 7a, constructed in accordance with the present invention.

2. As illustrated in FIGS. 1 and 2, the envelope 27 is preferably constructed from fabric-reinforced thermoplastic that serves as a reservoir containing contents for dispensing. Webbing 4 and 28 is attached to the envelope 27 as reinforcement and for load carrying purposes. The secondary support cables 7 are attached to the webbing 4 with D-rings 8 and cable shackles. A compression hoop 23 at the opening of the envelope gives the top of the reservoir structure. The envelope 27 is attached to the compression hoop 23, as illustrated in FIG. 6. The compression hoop 23 is attached to the envelope 27 through webbing 4 and 28 in eight (8) locations around the top circumference at the locations of the vertical webbing 4 using a loop of webbing 26, two (2) screws 30, a doubler 25, and two washers 29. The envelope 27 is attached to the valve 3, as illustrated in FIGS. 3, 4 and 7 using a ring and stud connector 9 looped into vertical webbing 4 screwed into a fork end 10 and bolted to the valve base at eight (8) locations 39. The envelope 27 is sealed to the valve base 36 using a large O-ring 31 and a clamping hoop 32. The clamping hoop 32 is secured against the top valve base hoop 40 with eight (8) saddle jackscrews 33 and two jam nuts 35 through angles 34 creating a collapsible structure that will be easily transported and replaced. The collapsible envelope could have a series of hoops to provide extra support and improve the aerodynamics in flight. Compression hoop 23 could also be filled with a weighted material to assist in sinking and filling.

Figure 5:
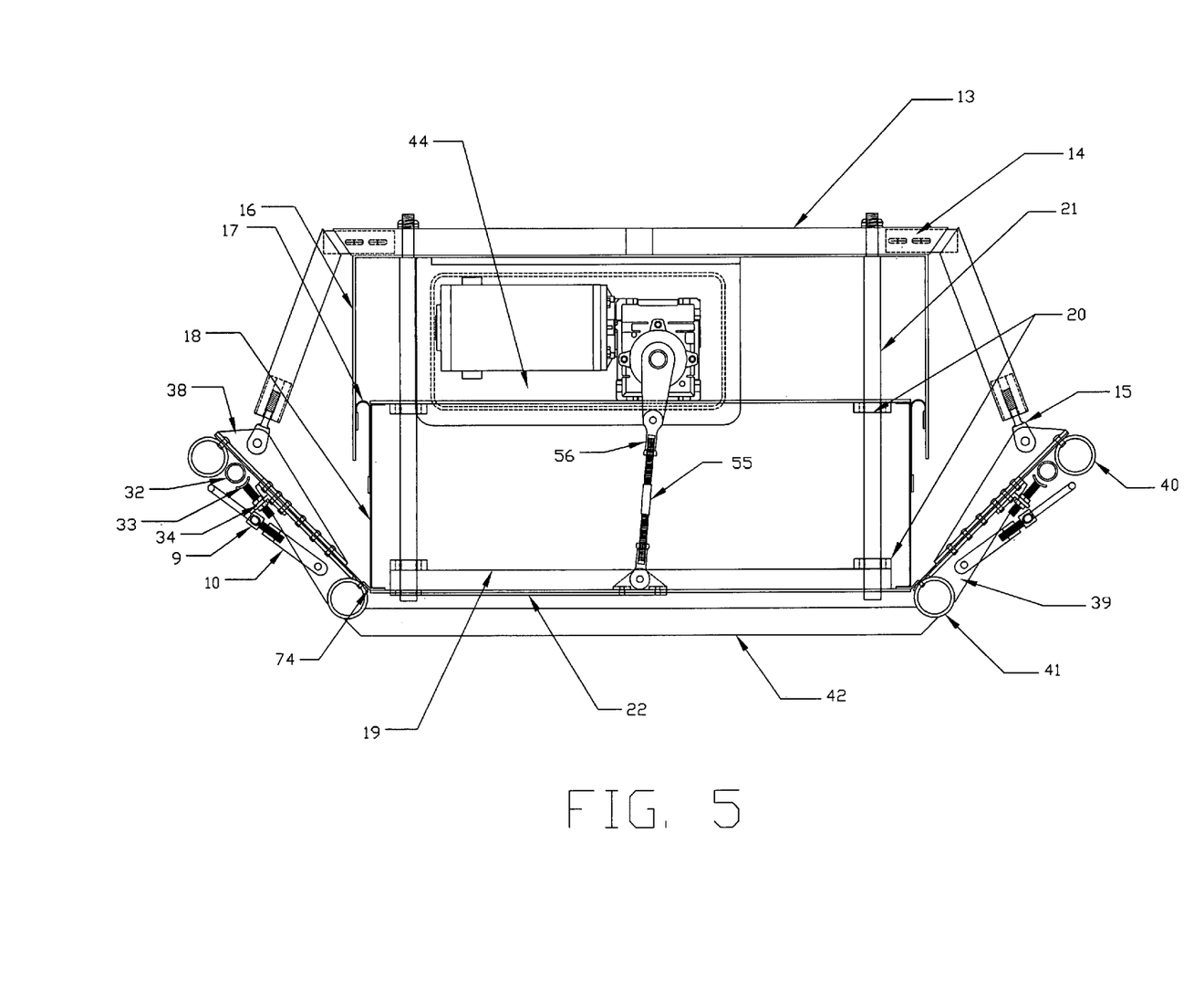
FIG. 5 is a sectional view illustrating a valve and valve actuator having an electric reversible geared motor of the water bucket system, constructed in accordance with the present invention.
Figure 8A:
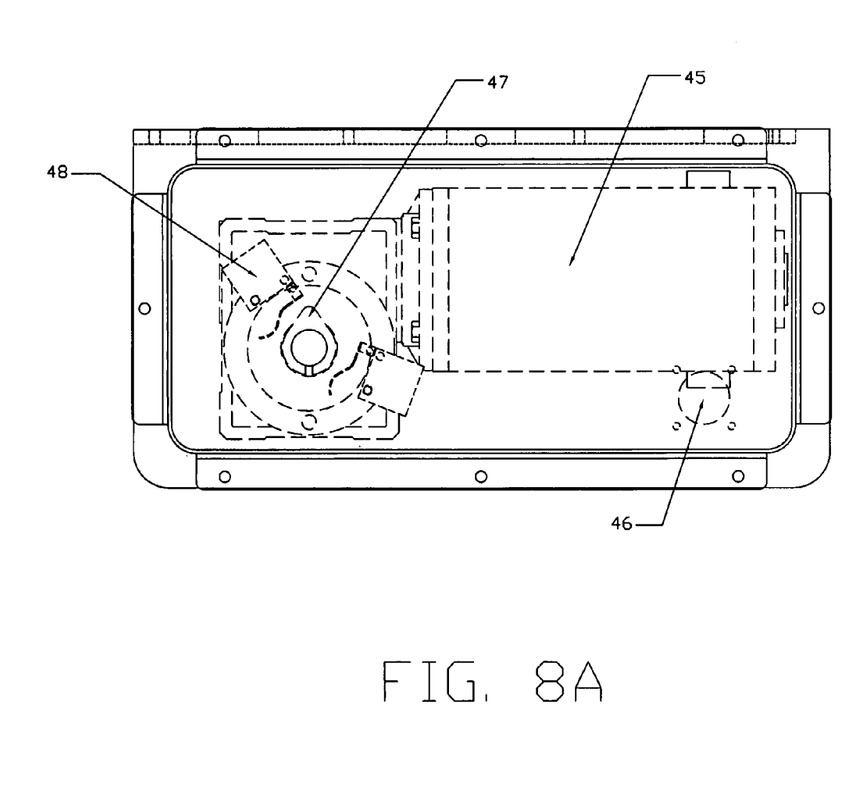
FIG. 8a is a sectional front view illustrating a valve actuator having an electric reversible geared motor (rotary actuator) of the water bucket system, constructed in accordance with the present invention.
Figure 8B:
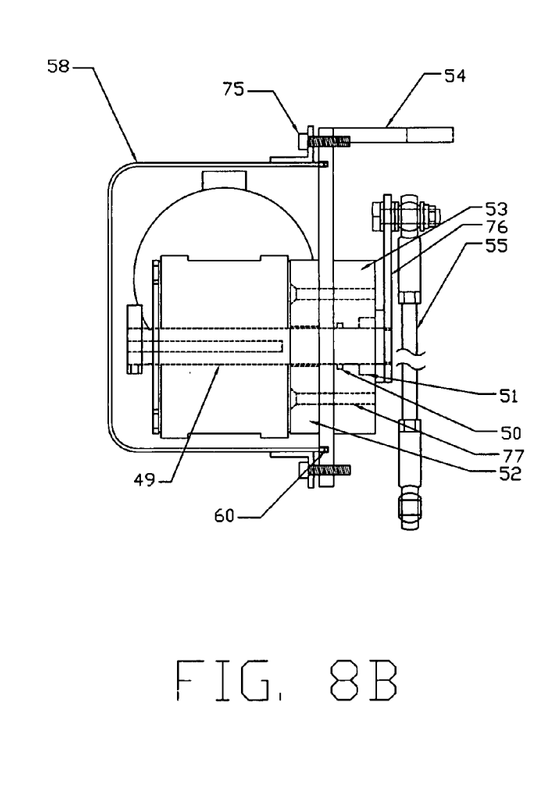
FIG. 8b is a sectional side view illustrating the valve actuator having an electric reversible geared motor (rotary actuator) of the water bucket system, constructed in accordance with the present invention.
Figure 9A:
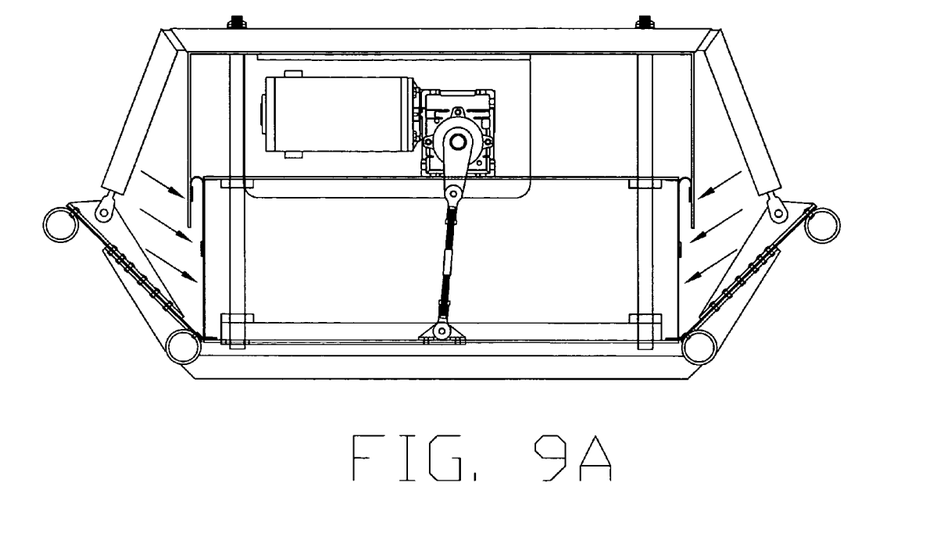
FIGS. 9a and 9b are sectional views illustrating a valve and actuator of the water bucket system, constructed in accordance with the present invention, with the actuator rotating one hundred and eighty (180°) degrees with an over center linkage opening and closing the valve.
Figure 9B:
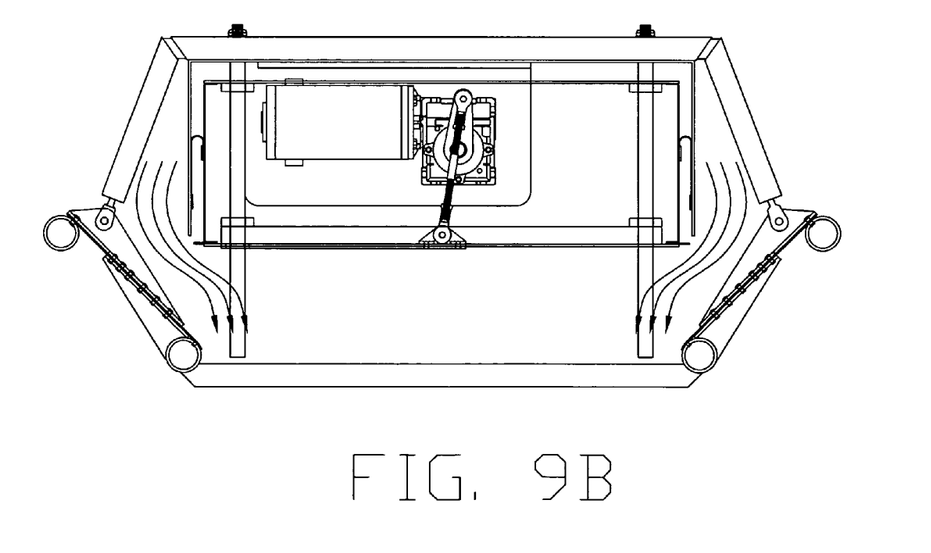

3. As illustrated in FIGS. 3, 5, and 8, the valve 3 itself is constructed of four (4) basic assemblies including a valve base 36, valve cover 16, inner cylinder 18 and actuator 44. The valve cover 16 is attached to the valve base 36 through a support brace 13 with vertical 15 and horizontal 14 adjustments. The actuator assembly 44 is mounted to the underside of the valve cover 16. The valve 3 is actuated using a right angle reversible gear motor 45 to provide rotary motion that is turned into linear motion through an actuator arm 76 and adjustable linkage push/pull rod 55 that moves the inner cylinder 18 inside the valve cover 16 on slide rods 21 opening and closing a pathway for contents to drain, as illustrated in FIG. 9. The push/pull rod 55 is attached to the inner cylinder 18 with a cantilever spring 22 attached to two support beams 19. The spring 22 acts as a safety mechanism that deflects if debris is lodged between the inner cylinder 18 and valve base 36. When the valve 3 is closed contents are sealed using a rubber seal 74 between the inner cylinder 18 and valve base 36, and with a rubber roller seal 17 between the inner cylinder 18 and valve cover 16. The inside of the valve 3 is vented to atmosphere through a vent tube 11 that prevents the valve 3 from floating and allows the contents inside the valve 3 to drain when it is removed from the water source. An expanded screen to keep debris from obstructing valve actuation protects the underside of the inner cylinder 18.

4. The actuating motor 45 is sealed in a watertight enclosure 58 that is attached to a motor mount plate 54 with screws 75 and an O-ring 60 illustrated in FIG. 8. The actuating motor 45 is mounted to the mount plate 54 through spacer block 52 and into seal block 53. The motor shaft 49 is sealed using an O-ring 50 and lip seal 51. O-ring 50 and lip seal 51 are mounted to seal block 53 that is attached to motor mount plate 54 with screws 77 that screw into spacer block 52. Control of the actuator is achieved using two limit switches 48, a switch cam 47 and dynamic braking or mechanical braking. The inner cylinder 18 can be opened to any position from closed to full open using a timed power input. Power is supplied to the actuator via a power cord that runs from the helicopter 1 through the vent hose 11 and into the motor enclosure 58 through the motor mount plate 54 with a watertight connector 46.

Figure 11:
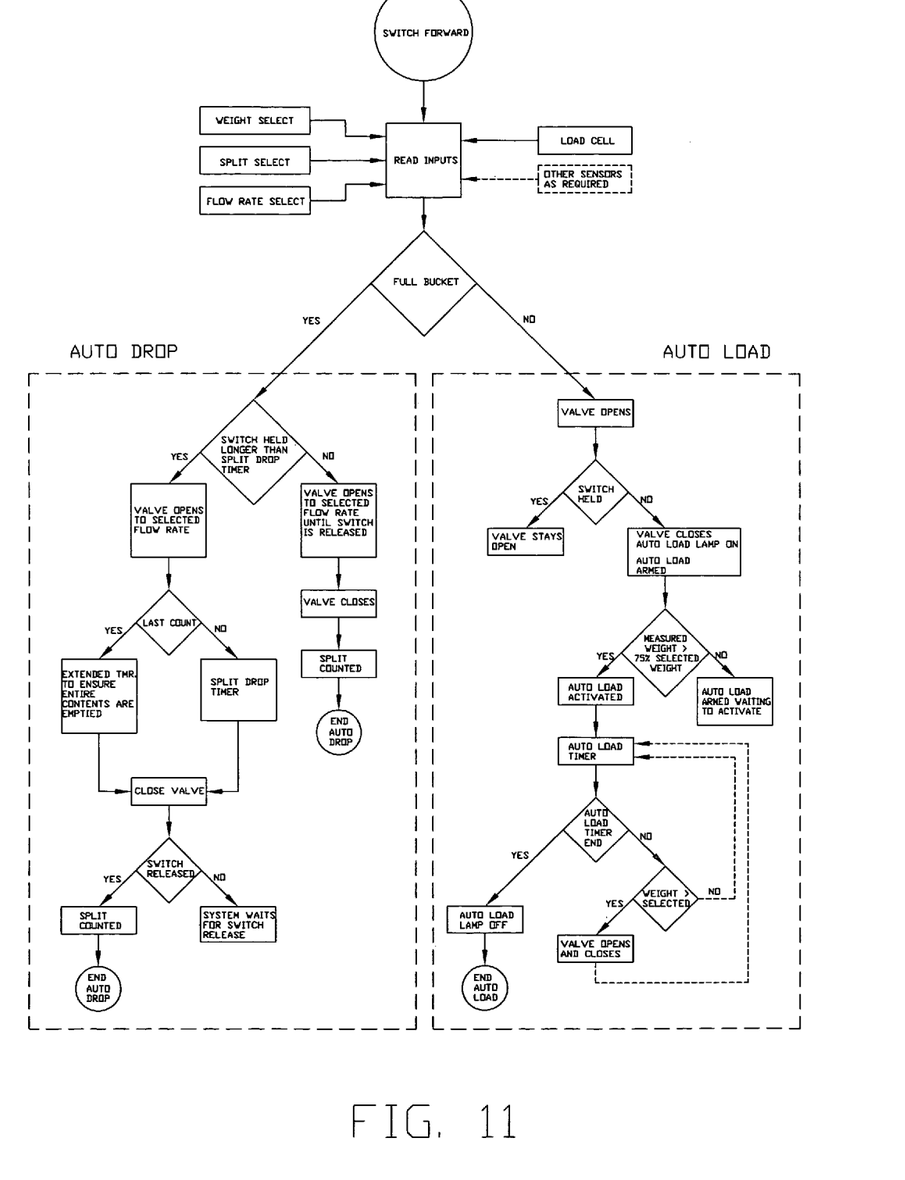
FIG. 11 is a flow chart illustrating the automated functions of the water bucket system.

Control Features:

Illustrated in FIG. 10 the control components consist of a junction box 70 that contains a programmable logic controller (PLC) or other appropriate computer controlling devices. A momentary DPDT (double pole double throw) drop switch 69 with center off, 5 BCD switches 66, 67, 68 or other similar pilot interface devices, load cell indicator 62 with appropriate filters, dampening, display and output characteristics. The automated functions are activated using the drop switch 69 in the forward position and manual operation is reserved for the aft position. A logic flow chart for switch forward operations is shown in FIG. 11.

Manual Mode:

In manual mode the valve is actuated using the aft and center off position of the drop switch 69. When the drop switch 69 is moved to the aft position the valve 3 will open and stay open as long as the drop switch 69 is held. When the drop switch 69 is released the valve 3 will close. If the drop switch 69 is held and released in the aft position before the valve 3 hits the upper limit switch 48 the valve will immediately reverse direction and close. Manual mode will work regardless of the computer operations and override all computer control involvement at ANY time.

Auto Load:

Three weight select BCD thumbwheels 68 on the control panel 63 select the weight of water in lbs. desired to be lifted. Numbers selected on the weight select thumbwheels 68 indicate the desired weight multiplied by 10. For example, 1-8-5 is equal to 1,850 lbs. of water.

Pressing the drop switch 69 forward, when the measured weight indicates an empty bucket, opens the valve 3, which will remain open as long as the drop switch 69 is held forward. Releasing the drop switch 69 to center off closes the valve 3 and arms the auto load mode. When auto load is armed a single annunciator lamp 64 is illuminated alerting the pilot that auto load is armed.

When auto load is armed the PLC compares the selected weight 68 to the measured weight. When the measured weight is 75% of the selected weight 68 auto load becomes active and starts a timer. In active mode the PLC opens and closes the valve 3 if the measured weight exceeds the selected weight 68. Active mode is active as long as the timer is still running. When the timer expires auto load is complete and terminates extinguishing the auto load lamp 64.

If for any reason the pilot wishes to deactivate the auto load function while it is armed or active, the drop switch 69 can be moved to the aft position. This reverts the system to manual mode opening the valve 3 and terminating auto load.

Auto Drop:

One thumbwheel on the control panel 63 selects how the load will be split. The pilot selects (1, 2, 3, or 4) on the thumbwheel 66 corresponding to (Full, 2 splits, 3 splits, or 4 splits. Another thumbwheel 67 on the control panel 63 selects the flow rate for the drop. The pilot selects (1, 2, 3, or 4) corresponding to (¼, ½, ¾, and Full) valve openings. The split select values and flow rate select values are for example purposes only and could be any value that is effective.

Pressing the drop switch 69 forward when the measured weight indicates a loaded bucket opens the valve and activates auto drop. The PLC looks up the appropriate time to open the valve based on the selected weight 68, selected split value 66, and selected flow rate 67. The valve 3 opens and stays open for the time required and closes completing the split. If G loading is encountered during the drop the PLC will compensate for the increased flow rate through various feedback devices and by comparing the selected weight 68 to the measured weight at the beginning of the drop and changing the flow rate accordingly. When the split is complete the PLC counts the split. When the last split in the sequence is initiated the PLC holds the valve 3 open for an extended time interval to ensure all the water in the water bucket is expelled. If the pilot releases the drop switch 69 before the split is finished the valve 3 will close terminating the drop but still counting the split.

If the selected split is set to "1" the system does not count splits and the forward position of the drop switch opens the valve according to the selected flow rate. Releasing the drop switch closes the valve.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A water bucket system having a water bucket, the water bucket system comprising:
  a main support cable;
  a spreader plate secured to the main support cable;
  a plurality of secondary support cables secured to the spreader plate;
  a plurality of equally spaced webbing straps secured to the secondary support cables;
  a fabric envelope secured to the webbing straps;
  a compression hoop secured to the webbing straps and the fabric envelope;
  a valve secured to the fabric envelope;
  loading means for loading of the water bucket from a water source;

measuring means for measuring the water load;
partial drop control means for controlling the drop of water from the water bucket onto a desired location; and
variable flow rate control means for varying the flow of water from the water bucket.

2. The water bucket system of claim 1 wherein the measuring means are selected from the group consisting of a cargo hook load cell for measuring weight and an electric sensor for measuring weight.

3. The water bucket of claim 1 wherein the envelope is preferably constructed from fabric-reinforced thermoplastic.

4. The water bucket of claim 1 wherein the envelope is sealed to the valve using an O-ring and a clamping hoop.

5. The water bucket of claim 1 wherein the envelope includes a series of hoops providing support and improving aerodynamics in flight.

6. The water bucket of claim 1 wherein the compression hoop is filled with a weighted material to assist in sinking and filling.

7. The water bucket of claim 1 wherein the valve includes further comprises:
a valve base;
a valve cover attached to the valve base through a support brace;
an inner cylinder slidably mounted within the valve cover; and
an actuating motor mounted to the valve cover for moving the inner cylinder within the valve cover.

8. The water bucket of claim 7 wherein the support brace has a vertical adjustment mechanism and a horizontal adjustment mechanism.

9. The water bucket of claim 7 wherein the actuating motor is a right angle reversible gear motor providing rotary motion translating into linear motion through an actuator arm and adjustable linkage push/pull rod.

10. The water bucket of claim 7 wherein the inner cylinder moves inside the valve cover on slide rods opening and closing a pathway for contents to drain.

11. The water bucket of claim 7 and further comprising:
a push/pull rod attached to the inner cylinder with a cantilever spring attached to two support beams.

12. The water bucket of claim 7 and further comprising:
a first seal between the inner cylinder and valve base; and a second seal between the inner cylinder and valve cover.

13. The water bucket of claim 7 and further comprising:
a vent tube for venting mounted inside of the valve to outside the valve.

14. The water bucket of claim 7 wherein the actuating motor is sealed in a watertight enclosure.

15. The water bucket of claim 7 wherein control of the actuating motor is achieved using two limit switches, a switch cam, and dynamic braking or mechanical braking.

16. The water bucket of claim 7 wherein the inner cylinder can be opened to any position from closed to full open using a timed power input.

17. The water bucket of claim 7 and further comprising:
a system for controlling the dropping of water from a water bucket, the system comprising:
a junction box having a programmable logic controller;
a momentary DPDT (double pole double throw) drop switch with center off;
a plurality of pilot interface switches; and
load cell indicator with filters, dampening, display and output characteristics;
wherein automated functions are activated using the drop switch in the forward position and manual operations are activated using the drop switch in the aft position.

18. The water bucket of claim 17 wherein in manual mode, the valve is actuated using the aft and center off position of the drop switch such that when the drop switch is moved to the aft position, the valve will open and stay open as long as the drop switch is held and such that when the drop switch is released, the valve will close.

19. The water bucket of claim 18 wherein if the drop switch is held and released in the aft position before the valve hits the upper limit switch, the valve will immediately reverse direction and close.

20. The water bucket of claim 17 wherein a portion of the pilot interface switches select the weight of water to be lifted.

21. The water bucket of claim 20 wherein when the drop switch is forward with the measured weight indicating an empty bucket, the valve opens and remains open as long as the drop switch is held forward.

22. The water bucket of claim 21 wherein releasing the drop switch to center off closes the valve and arms the auto load mode.

23. The water bucket of claim 22 wherein when auto load is armed, the programmable logic controller compares the selected weight to the measured weight such that when the measured weight is 75% of the selected weight, auto load becomes active and a timer begins.

24. The water bucket of claim 23 wherein in active mode, the programmable logic controller opens and closes the valve if the measured weight exceeds the selected weight.

25. The water bucket of claim 24 wherein active mode is active as long as the timer is still running and when the timer expires, auto load is complete and terminates extinguishing the auto load lamp.

26. The water bucket of claim 25 wherein the auto load function is deactivated by moving the drop switch to the aft position.

27. The water bucket of claim 17 wherein at least one of the pilot interface switches selects how the load will be split.

28. The water bucket of claim 17 wherein one of the pilot interface switches selects the flow rate for the drop.

29. The water bucket of claim 17 wherein the drop switch in the forward position with the measured weight indicating a loaded bucket opens the valve and activates auto drop.

30. The water bucket of claim 17 wherein the programmable logic controller determines the appropriate time to open the valve based on the selected weight, selected split value, and selected flow rate.

31. The water bucket of claim 17 wherein the valve is opened sufficient time to ensure all the water in the water bucket is expelled.

32. The water bucket of claim 1 wherein the measuring means for measuring the water load measures the weight of the water load.

33. A water bucket for carrying water, the water bucket comprising:
a main support cable;
a spreader plate secured to the main support cable;
a plurality of secondary support cables secured to the spreader plate;
a plurality of equally spaced webbing straps secured to the secondary support cables;
a fabric envelope secured to the webbing straps;
a compression hoop secured to the webbing straps and the fabric envelope; and
a valve secured to the fabric envelope.

34. The water bucket of claim 33 wherein the valve includes further comprises:
   a valve base;
   a valve cover attached to the valve base through a support brace;
   an inner cylinder slidably mounted within the valve cover; and
   an actuating motor mounted to the valve cover for moving the inner cylinder within the valve cover.

35. A method for loading and dropping water from a water bucket, the method comprising:
   providing a water bucket comprising:
      a main support cable;
      a spreader plate secured to the main support cable;
      a plurality of secondary support cables secured to the spreader plate;
      a plurality of equally spaced webbing straps secured to the secondary support cables;
      a fabric envelope secured to the webbing straps;
      a compression hoop secured to the webbing straps and the fabric envelope; and
      a valve secured to the fabric envelope;
   loading water into the water bucket from a water source;
   measuring the water load;
   controlling the drop of water from the water bucket onto a desired location; and
   varying the flow of water from the water bucket.

36. The method of claim 35 and further comprising:
   providing an electrically actuated mechanical bucket valve.

37. The method of claim 35 and further comprising:
   providing a momentary DPDT (double pole double throw) drop switch with center off.

38. The method of claim 35 and further comprising:
   measuring the weight of the water.

* * * * *